United States Patent
Yano

(10) Patent No.: US 6,782,197 B2
(45) Date of Patent: Aug. 24, 2004

(54) SUPER WIDE ANGLE ZOOM STROBE APPARATUS AND ZOOM COMPACT CAMERA HAVING ZOOM STROBE DEVICE

(75) Inventor: Takaaki Yano, Hokkaido (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/641,043

(22) Filed: Aug. 15, 2003

(65) Prior Publication Data

US 2004/0037549 A1 Feb. 26, 2004

(30) Foreign Application Priority Data

Aug. 20, 2002 (JP) ........................................ 2002-239594

(51) Int. Cl.$^7$ ............................................. G03B 15/05
(52) U.S. Cl. ........................................ 396/175; 362/18
(58) Field of Search ...................... 396/62, 175; 362/18

(56) References Cited

U.S. PATENT DOCUMENTS

| 5,584,572 A | 12/1996 | Ishikawa ................... 362/18 X |
| 6,400,905 B1 * | 6/2002 | Tenmyo ...................... 396/175 |
| 6,480,679 B1 | 11/2002 | Ishida et al. ................. 396/164 |
| 6,598,986 B2 | 7/2003 | Yano .......................... 362/18 |

FOREIGN PATENT DOCUMENTS

| JP | 7-110513 | 4/1995 | .......... G03B/15/05 |
| JP | 8-278536 | 10/1996 | .......... G03B/15/05 |
| JP | 2001-21960 | 1/2001 | .......... G03B/15/05 |
| JP | 2001-117151 | 4/2001 | .......... G03B/15/05 |

* cited by examiner

Primary Examiner—W. B. Perkey
(74) Attorney, Agent, or Firm—Greenblum & Bernstein, P.L.C.

(57) ABSTRACT

A zoom strobe device suitable for a super wide angle, in which a distance between a reflector, which is provided on the base thereof with a rod-shaped tubular light emitting tube and a Fresnel lens, is varied to vary a flash angle of illumination, wherein the zoom strobe device satisfies the following conditions (1) and (2):

$$0.08 < \phi \times Lw < 0.15 \quad (1)$$

$$0.70 < Lw/H < 0.85; \quad (2)$$

wherein φ designates the resultant power of the Fresnel lens in an upward/downward direction perpendicular to the length of the rod-shaped light emitting tube, Lw designates the distance between the base of the reflector and an outer surface of the Fresnel lens when the reflector is located closest to the Fresnel lens, and H designates the maximum length of the strobe device in the upward/downward direction.

3 Claims, 16 Drawing Sheets

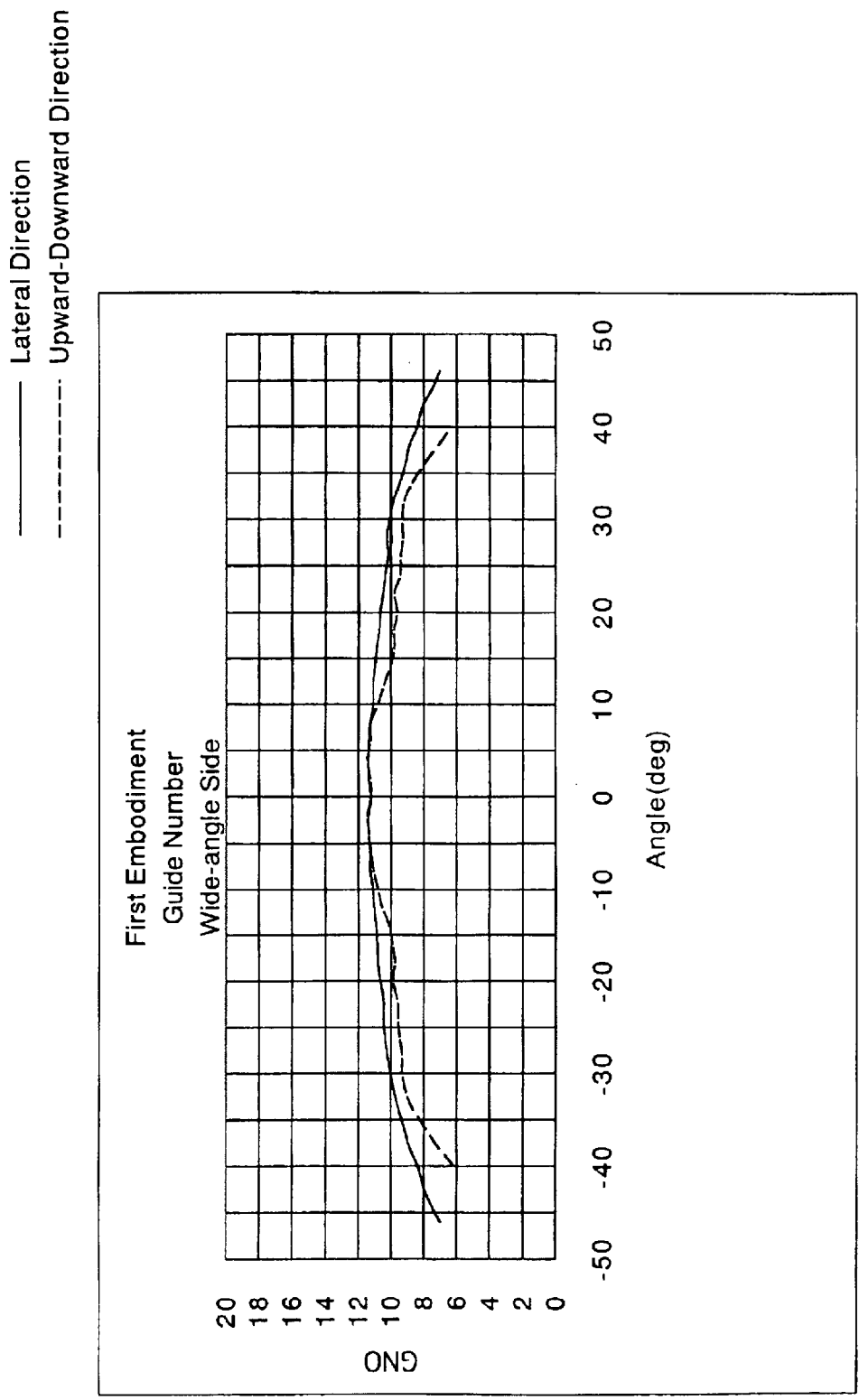

SUPER WIDE ANGLE ZOOM STROBE APPARATUS AND ZOOM COMPACT CAMERA HAVING ZOOM STROBE DEVICE

BACKGROUND OF THE INVENTION

1. Field of the Invention

The present invention relates to a zoom strobe device (a built-in type zoom strobe device) which can be advantageously incorporated in a camera.

2. Description of the Related Art

In accordance with miniaturization of recent compact zoom cameras (LS zoom cameras), miniaturization of a built-in strobe device is also required. In a built-in zoom strobe device, a flash coverage (illumination angle) is varied by varying the distance between a reflector which is provided the base thereof with a rod-shaped light emitting tube and a Fresnel lens. The illumination angle is reduced as the distance between the Fresnel lens and the reflector (rod-shaped light emitting tube) is increased.

In such a zoom strobe device, if the flash coverage of illumination is increased in accordance with a super wide angle of the camera, a large space is necessary. In particular, the size in the upward/downward direction must be increased relative to the size in the forward/rearward direction with respect to the thickness direction of the camera, thus resulting in difficulty in miniaturization of the camera. Furthermore, if a zoom ratio is increased, it is difficult to increase the guide number on the telephoto side (small flash coverage side). If a large guide number on the telephoto side is reserved, the marginal illumination on the wide angle side (large flash coverage side) is insufficient.

SUMMARY OF THE INVENTION

The present invention provides a small zoom strobe device in which sufficient illumination can be obtained from the wide angle side to the telephoto side and from the central area to the marginal area and is suitable for a super wide angle.

According to an aspect of the present invention, a zoom strobe device suitable for a super wide angle is provided, including a reflector, a rod-shaped tubular light emitting tube, and a Fresnel lens. A distance between the reflector, which is provided on the base thereof with the rod-shaped tubular light emitting tube, and the Fresnel lens is varied to vary a flash angle of illumination, wherein the zoom strobe device satisfies the following conditions (1) and (2):

$$0.08 < \phi \times Lw < 0.15 \quad (1);$$

$$0.70 < Lw/H < 0.85; \quad (2);$$

wherein
- $\phi$ designates the resultant power of the Fresnel lens in an upward/downward direction perpendicular to the length of the rod-shaped light emitting tube,
- $Lw$ designates the distance between the base of the reflector and an outer surface of the Fresnel lens when the reflector is located closest to the Fresnel lens, and
- $H$ designates the maximum length of the strobe device in the upward/downward direction.

It is desirable for the zoom strobe device to satisfy the following condition (3):

$$1.2 < Lt/H < 1.5 \quad (3);$$

wherein
- $Lt$ designates the distance between the base of the reflector and an outer surface of the Fresnel lens when the reflector is located farthest from the Fresnel lens.

In practice, a zoom strobe device suitable for a super wide angle can be incorporated in a zoom compact camera.

The present disclosure relates to subject matter contained in Japanese Patent Application No. 2002-239594 (filed on Aug. 20, 2002) which is expressly incorporated herein by reference in its entirety.

BRIEF DESCRIPTION OF THE DRAWINGS

The invention will be discussed below with reference to the accompanying drawings, in which:

FIG. 3 is a diagram showing guide numbers of a zoom strobe device shown in FIGS. 1A and 1B, at a wide angle extremity;

DESCRIPTION OF THE PREFERRED EMBODIMENT

Figure 1A:
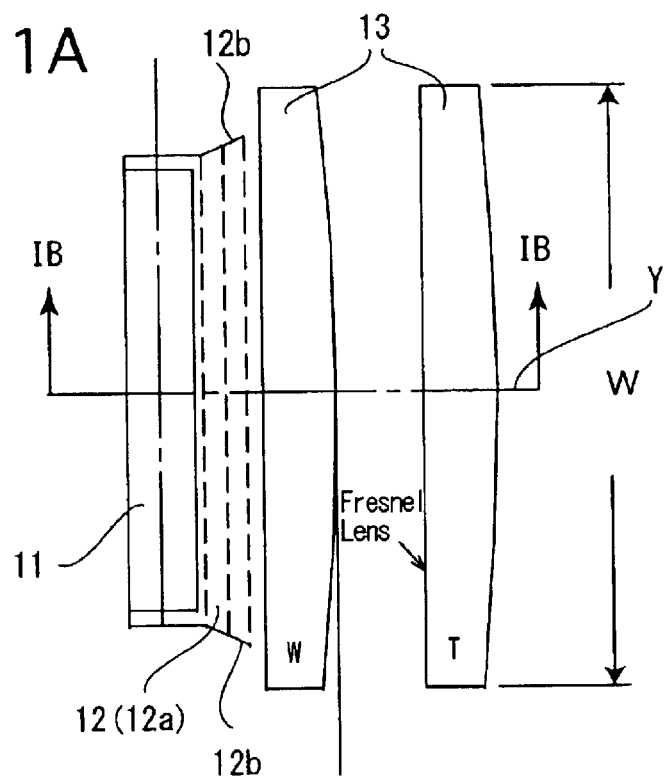
FIG. 1A is a plan view of a zoom strobe device suitable for a super wide angle lens according to an embodiment of the invention.
Figure 1B:
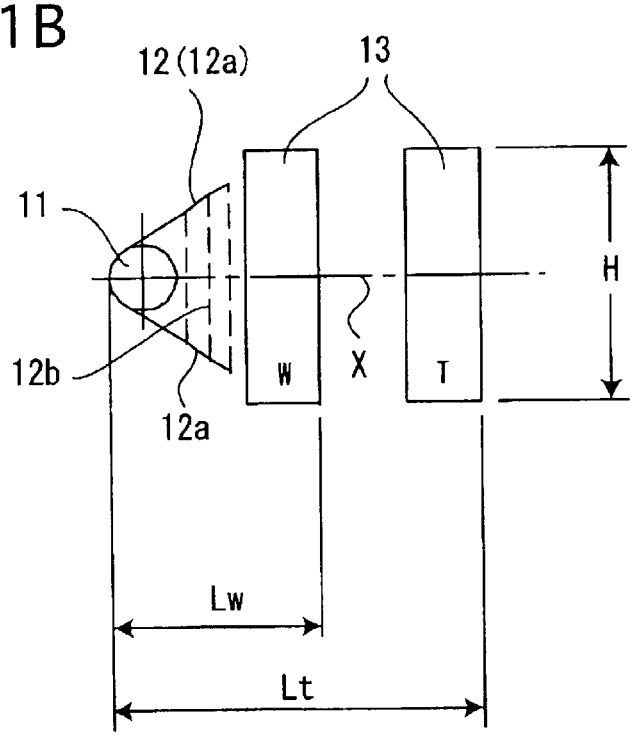
FIG. 1B is a sectional view taken along the line IB—IB in FIG. 1A.

A zoom strobe device according to the present invention is constructed from a rod-shaped light emitting tube 11, a reflector 12, and a Fresnel lens 13, as shown in FIGS. 1A and 1B. The reflector 12 is provided with a pair of reflecting surfaces 12a which are symmetrical with respect to a plane X passing through the center of the rod-shaped light emitting tube 11 and mutually extend increasingly away from the plane X in a direction toward the Fresnel lens 13. The light emitting tube 11 is located at the base of (i.e., behind) the reflecting surfaces 12a (on the left side of the reflecting surfaces 12a as shown in FIGS. 1A and 1B). The reflector 12 is provided with a pair of reflecting surfaces 12b which mutually extend increasingly away from the plane X in a direction toward the Fresnel lens 13, at the opposite ends of the light emitting tube 11. The Fresnel lens 13 is perpendicular to the plane X and is provided on at least one surface thereof with a Fresnel surface. The power of the Fresnel lens 13 differs in the length direction from a direction perpendicular thereto, with respect to the light emitting tube 11. The axis perpendicular to the center axis of the light emitting tube 11 on the plane X defines an optical axis Y. In the zoom strobe device, when the reflector 12 (light emitting tube 11) is closest to the Fresnel lens 13, the illumination angle is maximum (wide angle extremity), and as the distance therebetween is increased, the illumination angle is reduced. When the reflector is located farthest from the Fresnel lens, the illumination angle is minimum. Note that, in FIGS. 1A and 1B, two positions of the Fresnel lens 13 with respect to the reflector 12 are shown.

The size of the zoom strobe device of the present invention is determined by the distance Lt between the base of the reflector 12 (the rod-shaped light emitting tube 11) and the outer surface of the Fresnel lens 13 when the reflector 12 is located farthest from the Fresnel lens 13, and the height H and width W of the Fresnel lens 13. Namely, the maximum length of the strobe device in the upward/downward direction is the same as the height H of the Fresnel lens 13 in the illustrated embodiment.

In general, a decrease of the length in the forward/rearward direction reduces the guide number on the telephoto side, and a decrease of the length in the upward/downward direction and the lateral direction reduces the amount of the marginal strobe flash in the upward/downward direction and the lateral direction, respectively. In particular, the amount of the marginal strobe light in the upward/downward direction tends to be the most easily influenced because the rod-shaped light emitting tube 11 is elongated in the lateral direction.

Condition (1) concerns making the illumination angle, particularly in the upward/downward direction, accommodate a super wide angle. The super wide angle refers to an angle more than approximately 84 degrees (2 ω; ω=half angle of illumination) corresponding to a focal length less than the shortest focal length 24 mm when the strobe device is incorporated in a 35 mm film camera. In general, in a zoom strobe device, the resulting power φ of the Fresnel lens in the upward/downward direction and the length Lw in the forward/rearward direction at the wide angle extremity satisfy the following condition:

$$Lw < 1/\phi$$

Consequently, divergent light is emitted from the Fresnel lens toward an object to be photographed. In a conventional zoom strobe device, the value of φ×Lw is not less than 0.2. However, in order to be suitable for a super wide angle, it is necessary to reduce the power of the lens in the upward/downward direction, because it is otherwise impossible to illuminate the entirety of the wide light distribution range. For a super wide angle, it is desirable that the value of φ×Lw be less than 0.15. However, if the value of φ is too small, the guide number on the telephoto side cannot be increased. Under these circumstances, it is desirable that the lower limit of φ×Lw be above 0.08.

Condition (2) concerns obtaining sufficient amount of light on the telephoto side, so as to be suitable for a super wide angle. The illumination area is increased as the distance between the Fresnel lens and the reflector is decreased and, hence, it is desirable that the length in the forward/rearward direction at the wide angle extremity be as small as possible. For a super wide angle, the value of Lw/H is desirably less than 0.85. If the value is not less than 0.85, it is difficult to illuminate the entire light distribution range in the upward/downward direction at the wide angle extremity. If the value is not less than 0.85, it is necessary to reduce the power of the lens in the upward/downward direction, so that the guide number on the telephoto side cannot be increased. However, if the value is smaller than the lower limit in condition (2), the reflector is so small that the amount of light at the marginal portion or central portion cannot be increased by light reflected by the reflector.

Condition (3) defines the size of the strobe device in the forward/rearward direction at the telephoto side. A decrease in the size of the strobe device in the forward/rearward direction means a decrease in the length in the forward/rearward direction at the telephoto side. In general, if the size of the strobe device at the telephoto side in the forward/rearward direction is reduced, the guide number is reduced from the wide angle extremity toward the telephoto extremity. The guide number on the telephoto side can be increased by enhancing the power of the lens. However, enhancement of the lens power makes it difficult to adapt the strobe device for a super wide angle on the wide angle side. If the ratio defined in condition (3) exceeds 1.5, i.e., exceeds the upper limit, the length in the forward/rearward direction is too large to achieve a miniaturized camera. Conversely, if the ratio is smaller than 1.2, i.e., the lower limit, it is necessary to enhance the power of the Fresnel lens. Consequently, it is difficult to make the strobe device accommodate a super wide angle on the wide angle side.

Three examples of numerical data of the present invention will be discussed below.

EXAMPLE 1

Figure 2A:
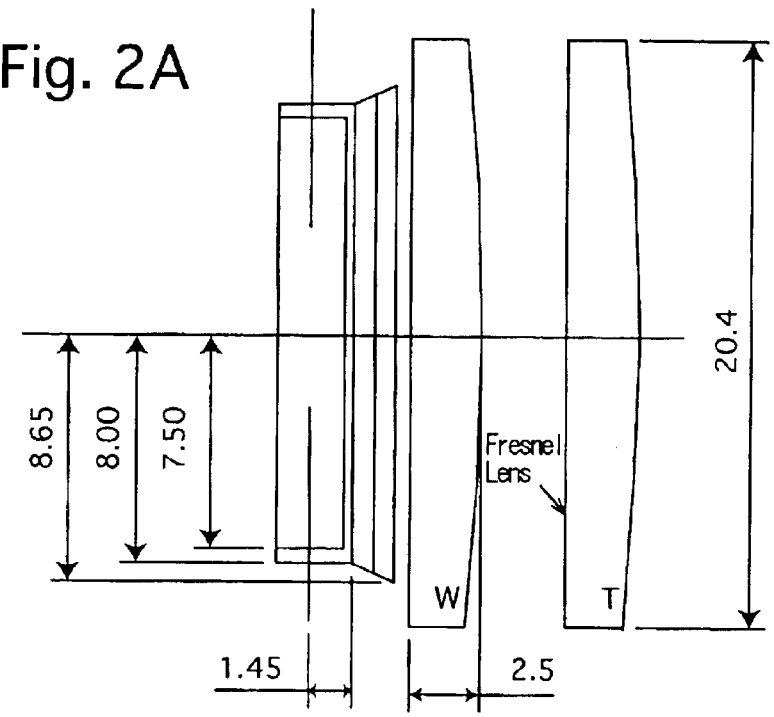
FIG. 2A is a plan view and a sectional view, of a zoom strobe device suitable for a super wide angle lens, showing an Example 1 of numerical values (mm)
Figure 2B:
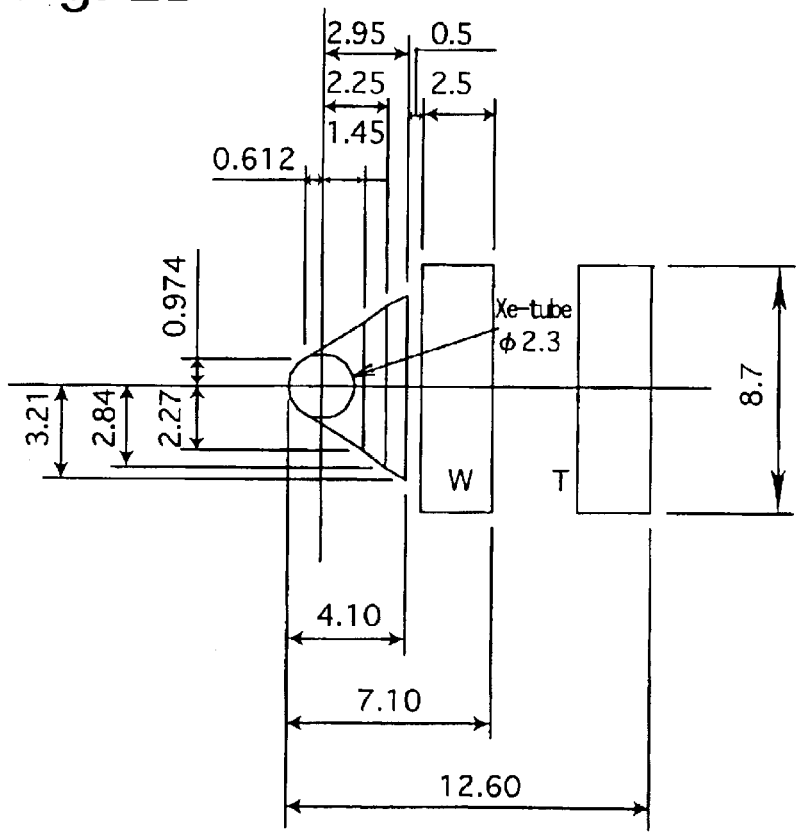
FIG. 2B is a plan view and a sectional view, of a zoom strobe device suitable for a super wide angle lens, showing an Example 1 of numerical values (mm)
Figure 4:
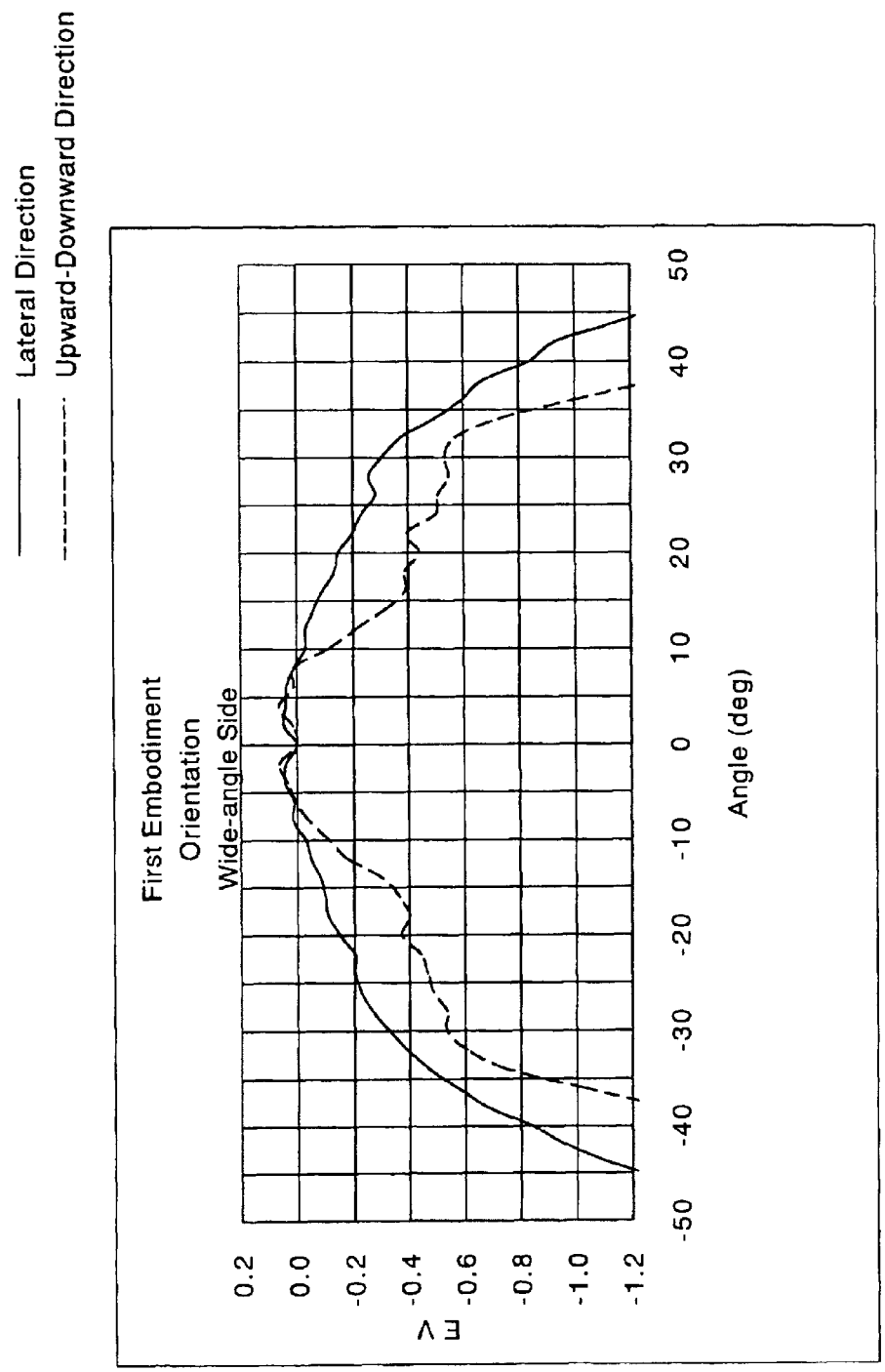
FIG. 4 is a diagram showing light distribution characteristics of a zoom strobe device at a wide angle extremity.
Figure 5:
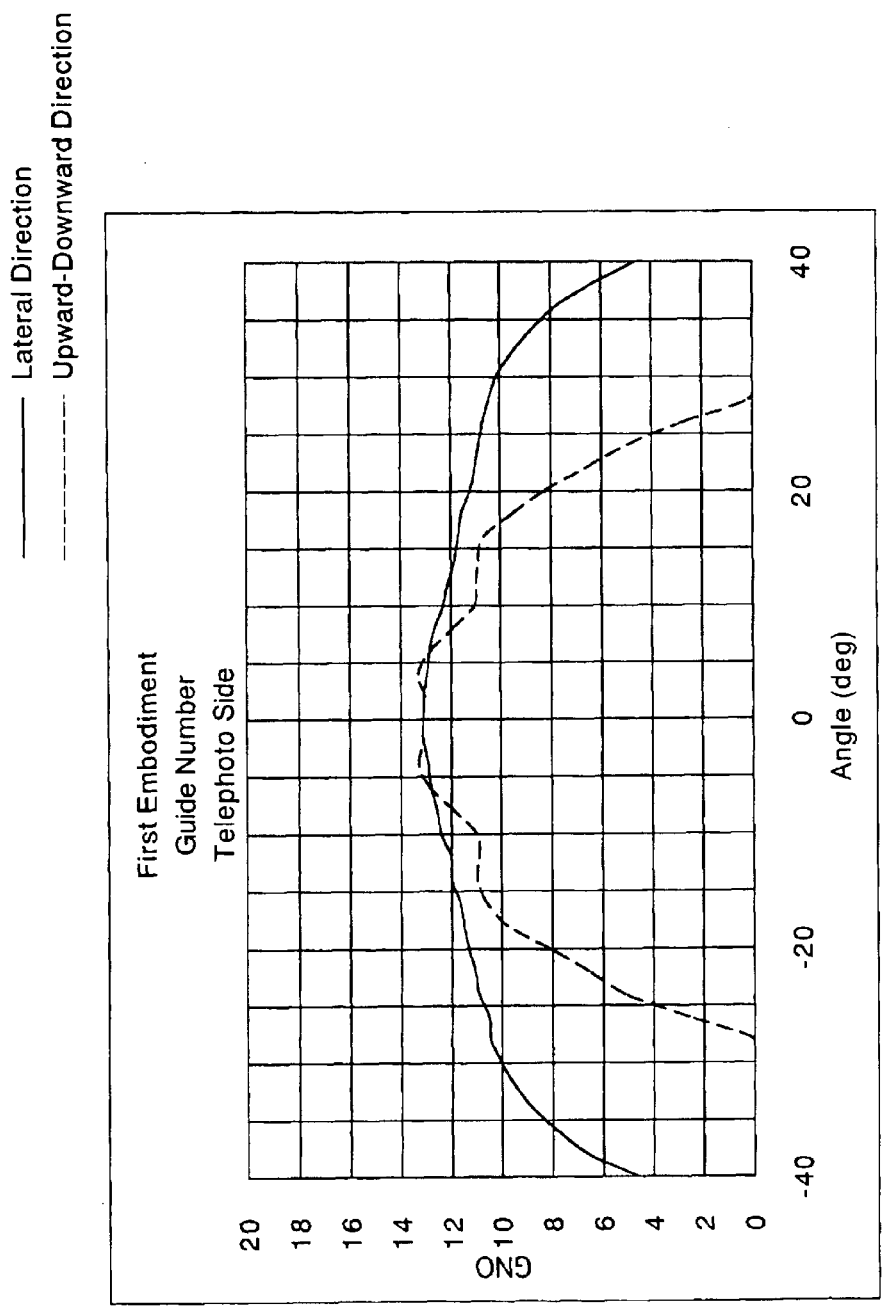
FIG. 5 is a diagram showing guide numbers of a zoom strobe device shown in FIGS. 1A and 1B, at a telephoto extremity.
Figure 6:
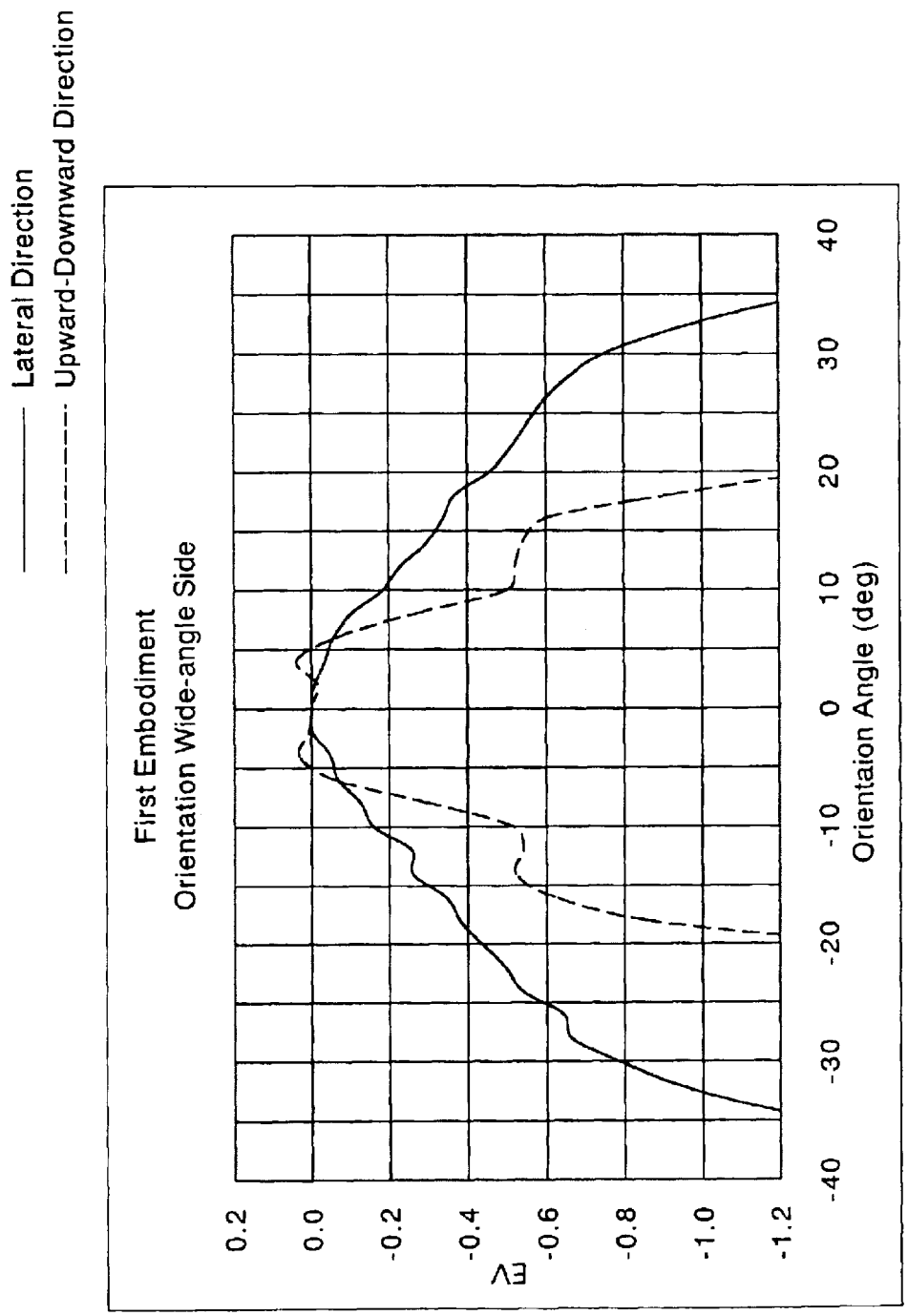
FIG. 6 is a diagram showing light distribution characteristics of a zoom strobe device at a telephoto extremity.

FIGS. 2A and 2B show a structure of Example 1 of numerical data of a zoom strobe device which can accommodate a super wide angle, according to the present invention. FIGS. 3, 4, 5 and 6 show diagrams of the guide number at the wide angle extremity, the light distribution characteristics at the wide angle extremity, the guide number at the telephoto extremity and the light distribution characteristics at the telephoto extremity, of a strobe device shown in FIGS. 1A and 1B, respectively.

Specifications of Example 1 are as follows (mm). EV variation (ΔEV) represents the variation in the amount of light of strobe flash at the marginal portion, with reference to the central portion (optical axis) at which ΔEV is 0. The EV variation logarithmically represents a variation of the amount of light, the same as an exposure value (EV) which is generally used in photography. When the amount of light is reduced by half, $\Delta EV = -1$. The $\Delta EV$ and the guide number satisfy the following relationships:

$\Delta EV = \log(MGN/CGN)/\log(2^{1/2})$ (MGN: Marginal guide number, CGN: Center guide number)

Height H of the Fresnel lens in the upward/downward direction: 8.7

Width W of the Fresnel lens in the lateral direction: 20.4

Specifications of the first surface of the Fresnel lens (adjacent to the reflector):

$R=30$ (Rotationally symmetrical spherical surface, Fresnel pitch= 0.5)

Specifications of the second surface of the Fresnel lens:

$Ry$ (upward/downward direction)=$\infty$, $Rz$ (lateral direction)=$-100$

Length Lw in the forward/rearward direction on the wide angle side: 7.1

Length Lt in the forward/rearward direction on the telephoto side: 12.6

Resultant lens power $\phi$ in the upward/downward direction: 0.0165

Guide number at the wide angle extremity: 11.21

EV variation at the wide angle extremity ($\Delta EV$) (31° in the upward/downward direction): $-0.56$ EV variation at the wide angle extremity ($\Delta EV$) (41° in the lateral direction): $-0.89$ Guide number at the telephoto extremity: 13.13

EV variation at the telephoto extremity ($\Delta EV$) (12° in the upward/downward direction): $-0.53$ EV variation at the telephoto extremity ($\Delta EV$) (16° in the lateral direction): $-0.34$

EXAMPLE 2

Figure 7A:
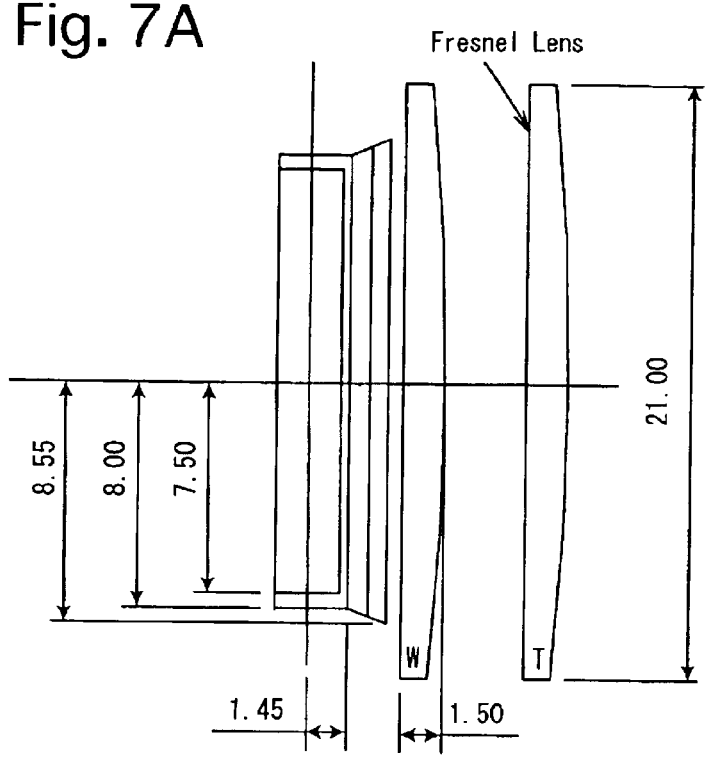
FIG. 7A is a plan view and a sectional view, of a zoom strobe device suitable for a super wide angle lens, showing an Example 2 of numerical values (mm)
Figure 7B:
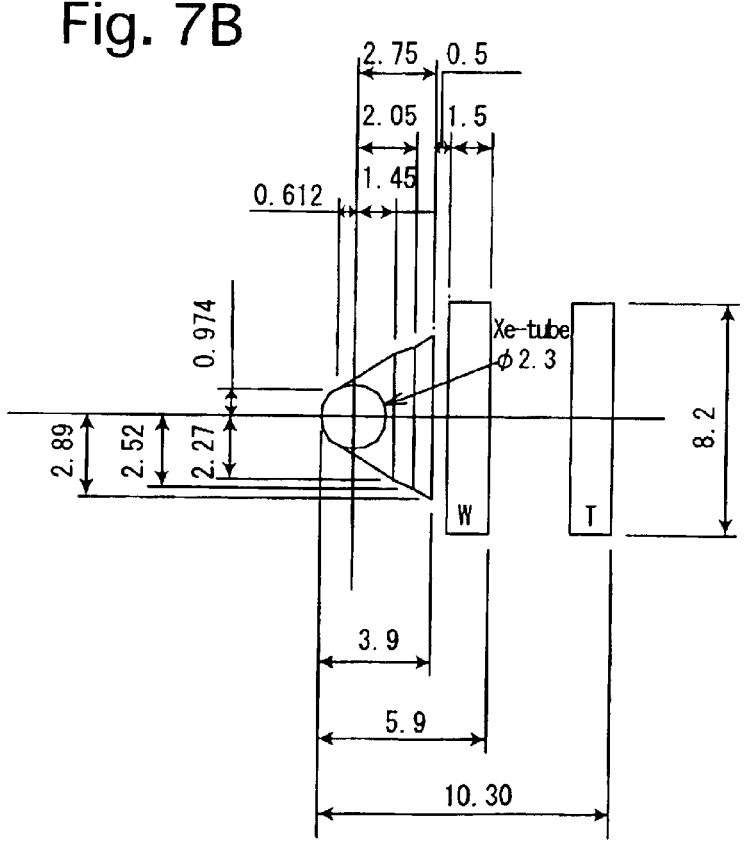
FIG. 7B is a plan view and a sectional view, of a zoom strobe device suitable for a super wide angle lens, showing an Example 2 of numerical values (mm)
Figure 8:
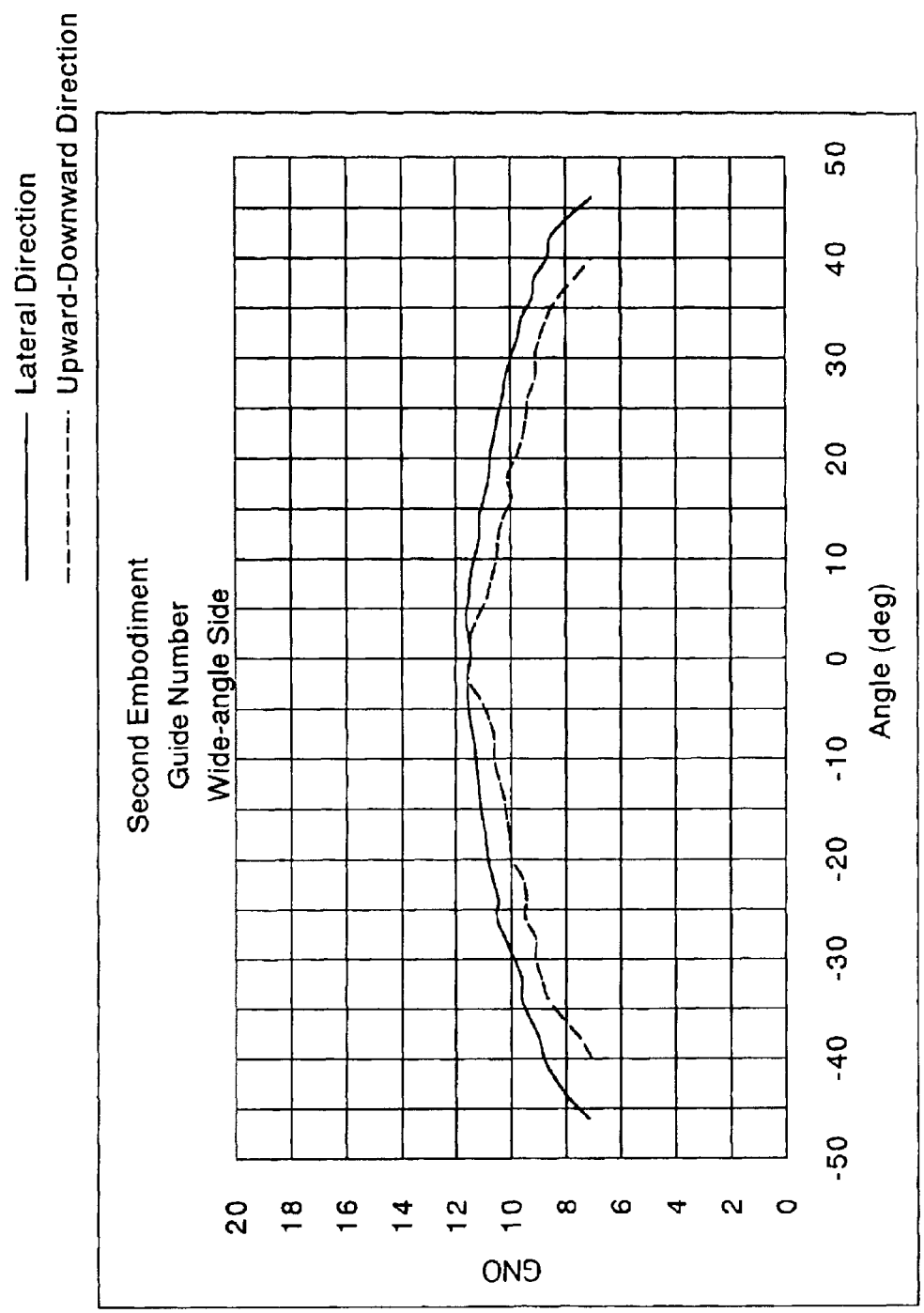
FIG. 8 is a diagram showing guide numbers of a zoom strobe device shown in FIGS. 7A and 7B, at a wide angle extremity.
Figure 9:
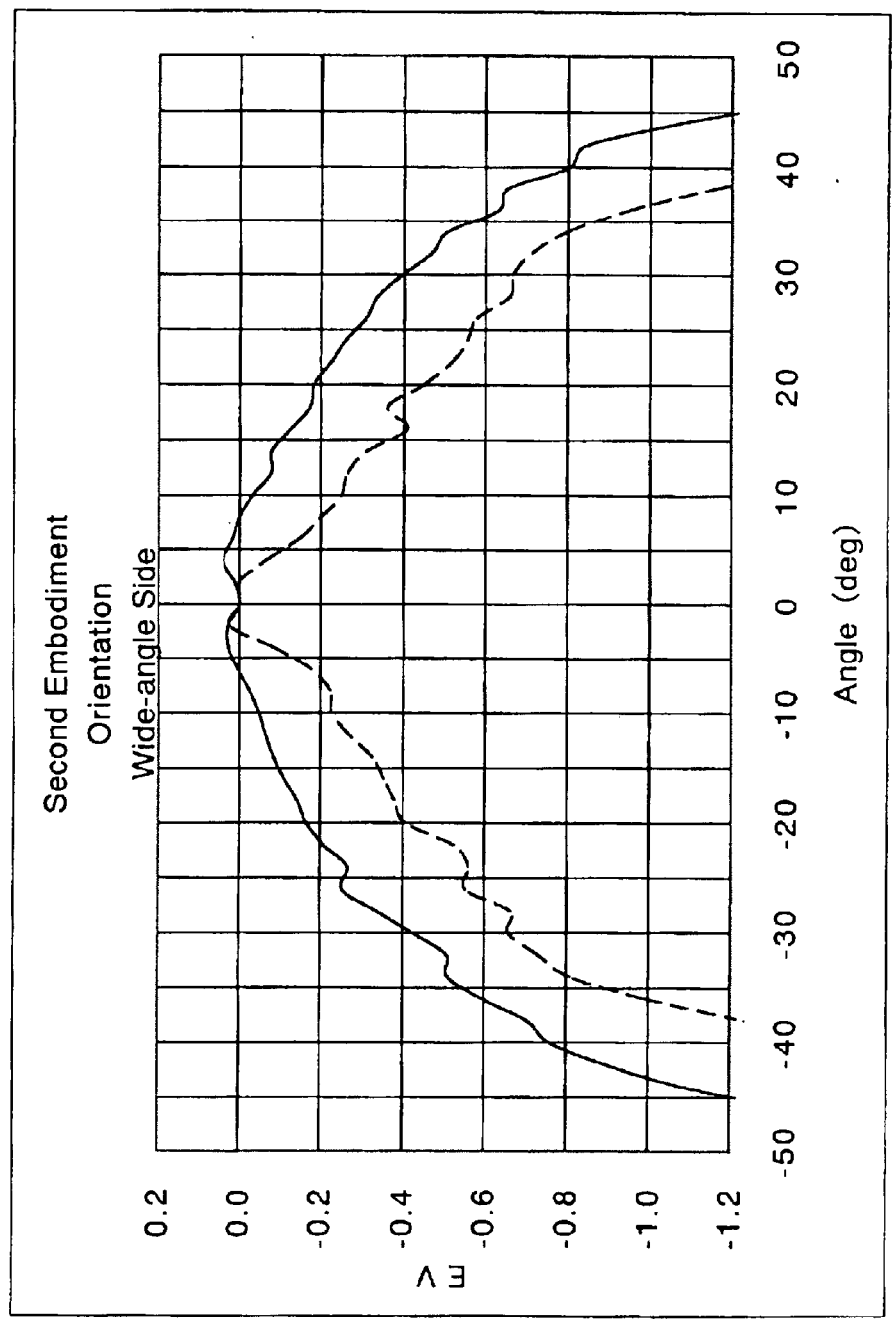
FIG. 9 is a diagram showing light distribution characteristics of a zoom strobe device at a wide angle extremity.
Figure 10:
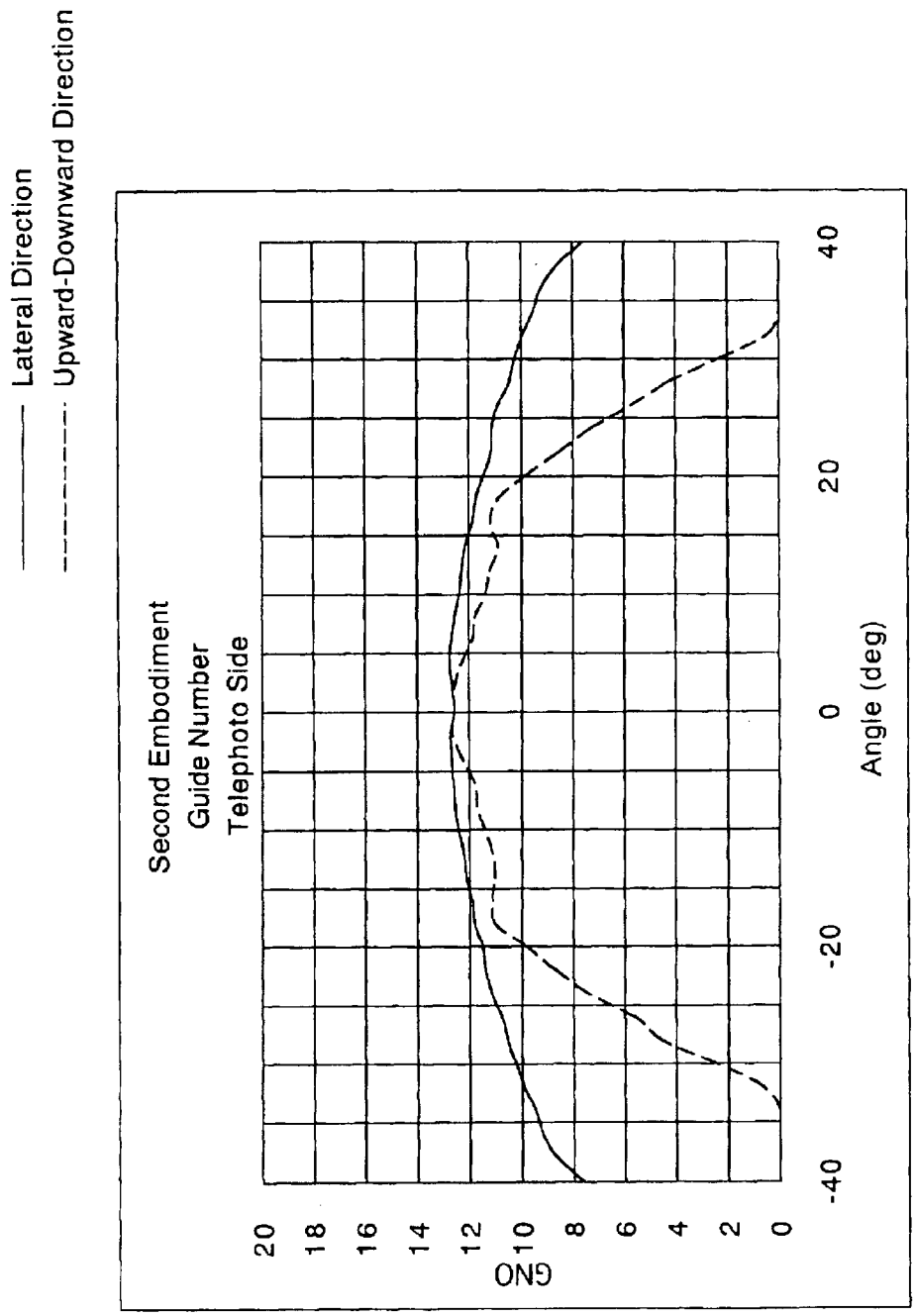
FIG. 10 is a diagram showing guide numbers of a zoom strobe device shown in FIGS. 7A and 7B, at a telephoto extremity.
Figure 11:
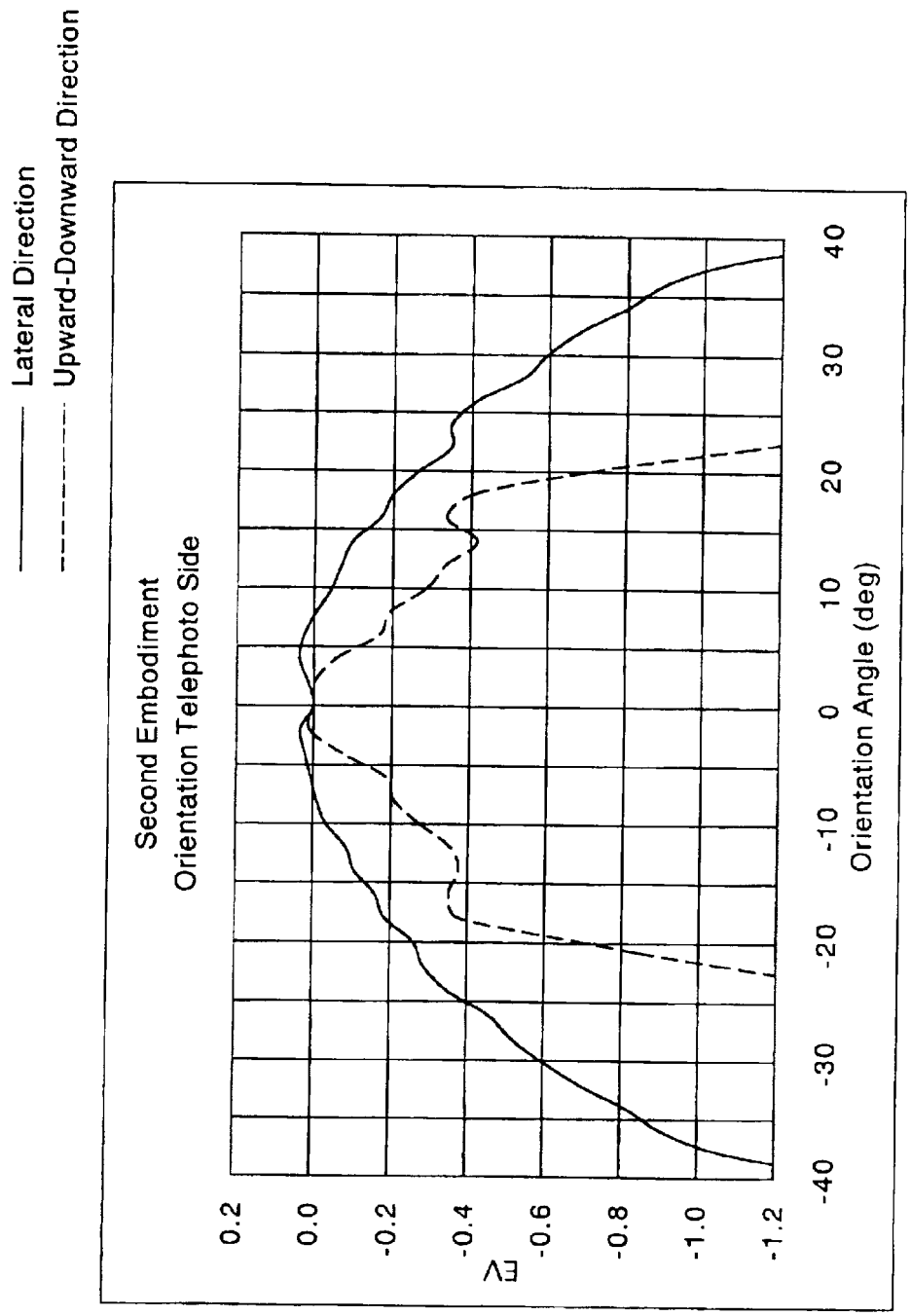
FIG. 11 is a diagram showing light distribution characteristics of a zoom strobe device at a telephoto extremity.

FIGS. 7A and 7B show a structure of Example 2 of numerical data of a zoom strobe device applied to a super wide angle, according to the present invention. FIGS. 8, 9, 10 and 11 show diagrams of the guide number at the wide angle extremity, the light distribution characteristics at the wide angle extremity, the guide number at the telephoto extremity and the light distribution characteristics at the telephoto extremity, of a strobe device shown in FIGS. 7A and 7B, respectively.

Specifications of Example 2 are as follows.

Height H of the Fresnel lens in the upward/downward direction: 8.2

Width W of the Fresnel lens in the lateral direction: 21.0

Specifications of the first surface of the Fresnel lens (adjacent to the reflector):

$R=20$, $K=-20$ (rotationally symmetrical aspherical surface, Fresnel pitch 0.5)

Specifications of the second surface of the Fresnel lens:

$Ry$ (upward/downward direction)=$\infty$, $Rz$ (lateral direction)=$-100$

Length Lw in the forward/rearward direction on the wide angle side: 5.9

Length Lt in the forward/rearward direction on the telephoto side: 10.3

Resultant lens power $\phi$ in the upward/downward direction: 0.0247

Guide number at the wide angle extremity: 11.46 EV variation at the wide angle extremity ($\Delta EV$) (31° in the upward/downward direction): $-0.69$ EV variation at the wide angle extremity ($\Delta EV$) (41° in the lateral direction): $-0.82$ Guide number at the telephoto extremity: 12.58

EV variation at the telephoto extremity ($\Delta EV$) (12° in the upward/downward direction): $-0.35$ EV variation at the telephoto extremity ($\Delta EV$) (16° in the lateral direction): $-0.17$

EXAMPLE 3

Figure 12A:
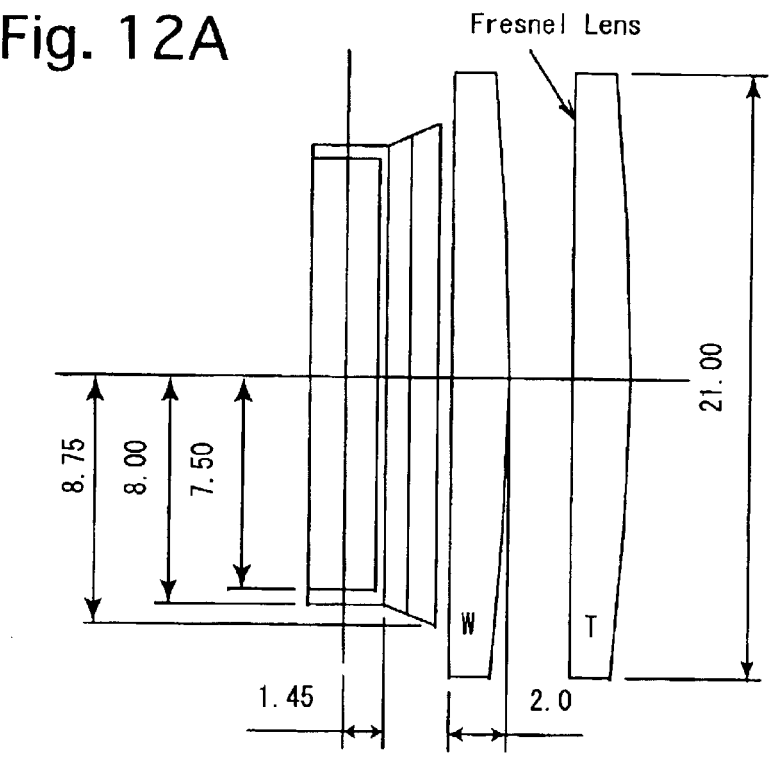
FIGS. 12A is a plan view and a sectional view, of a zoom strobe device suitable for a super wide angle lens, showing an Example 3 of numerical values (mm)
Figure 12B:
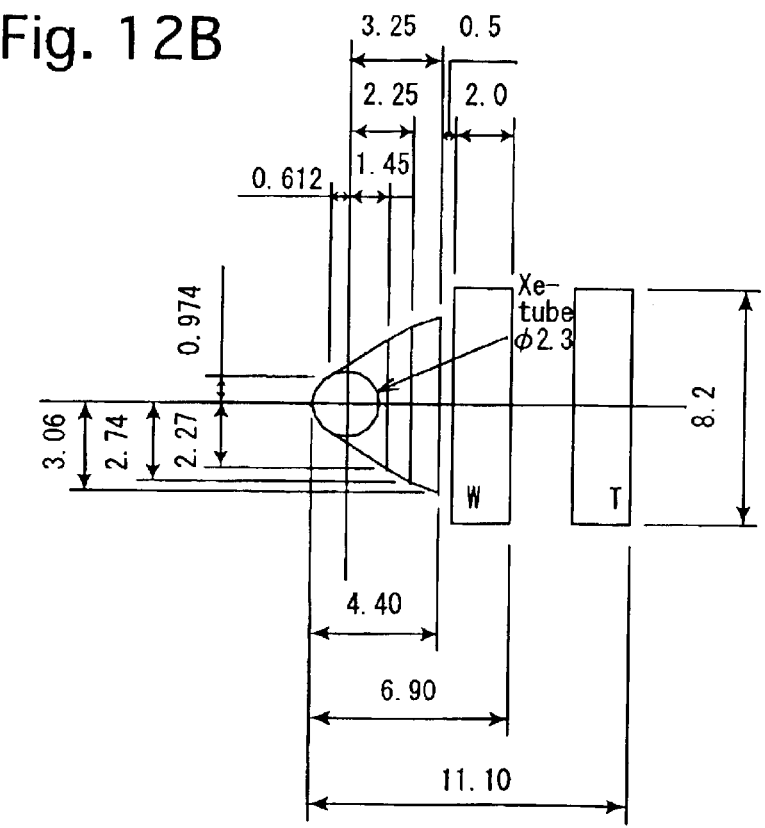
FIG. 12B is a plan view and a sectional view, of a zoom strobe device suitable for a super wide angle lens, showing an Example 3 of numerical values (mm)
Figure 13:
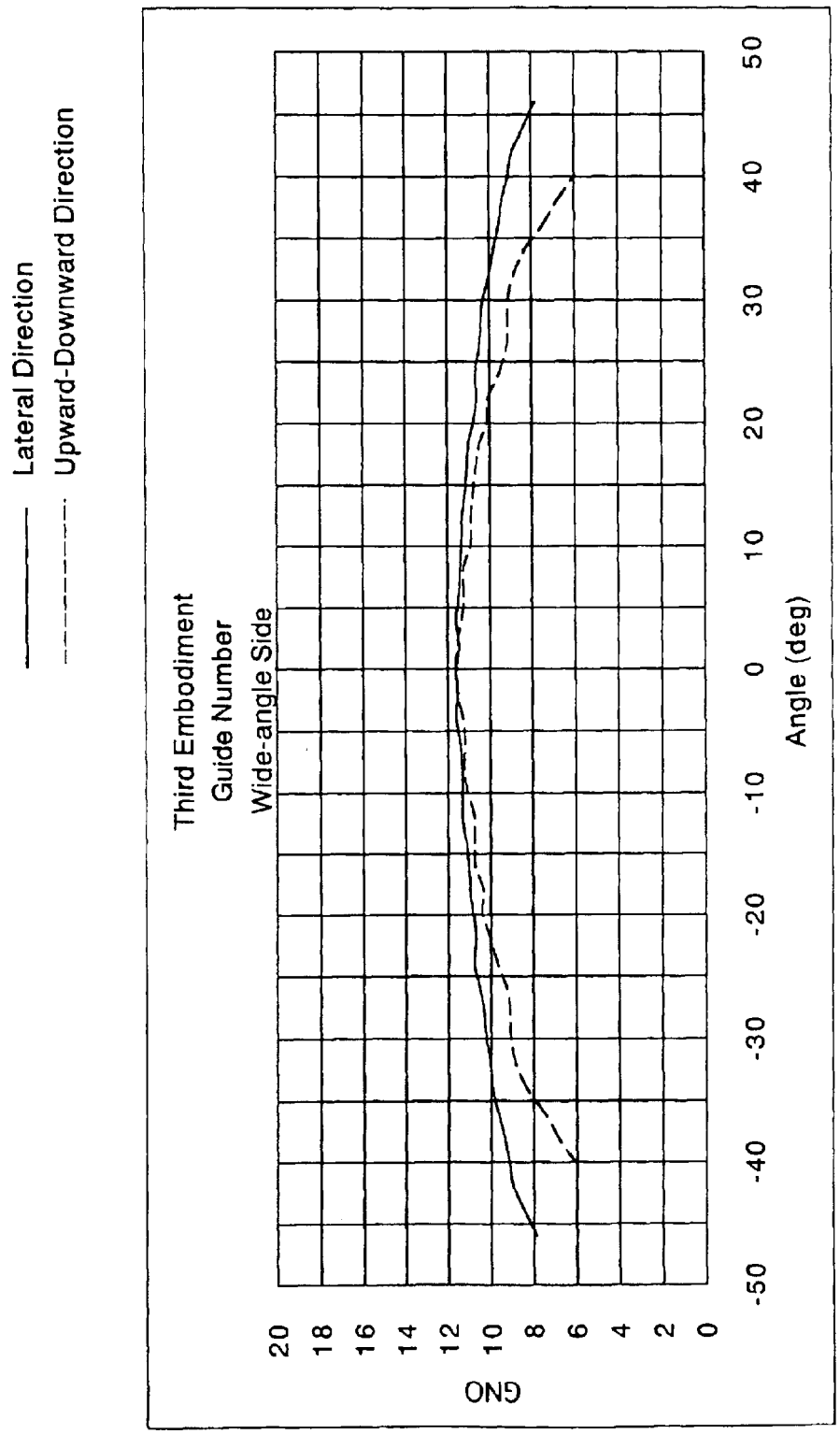
FIG. 13 is a diagram showing guide numbers of a zoom strobe device shown in FIGS. 12A and 12B, at a wide angle extremity.
Figure 14:
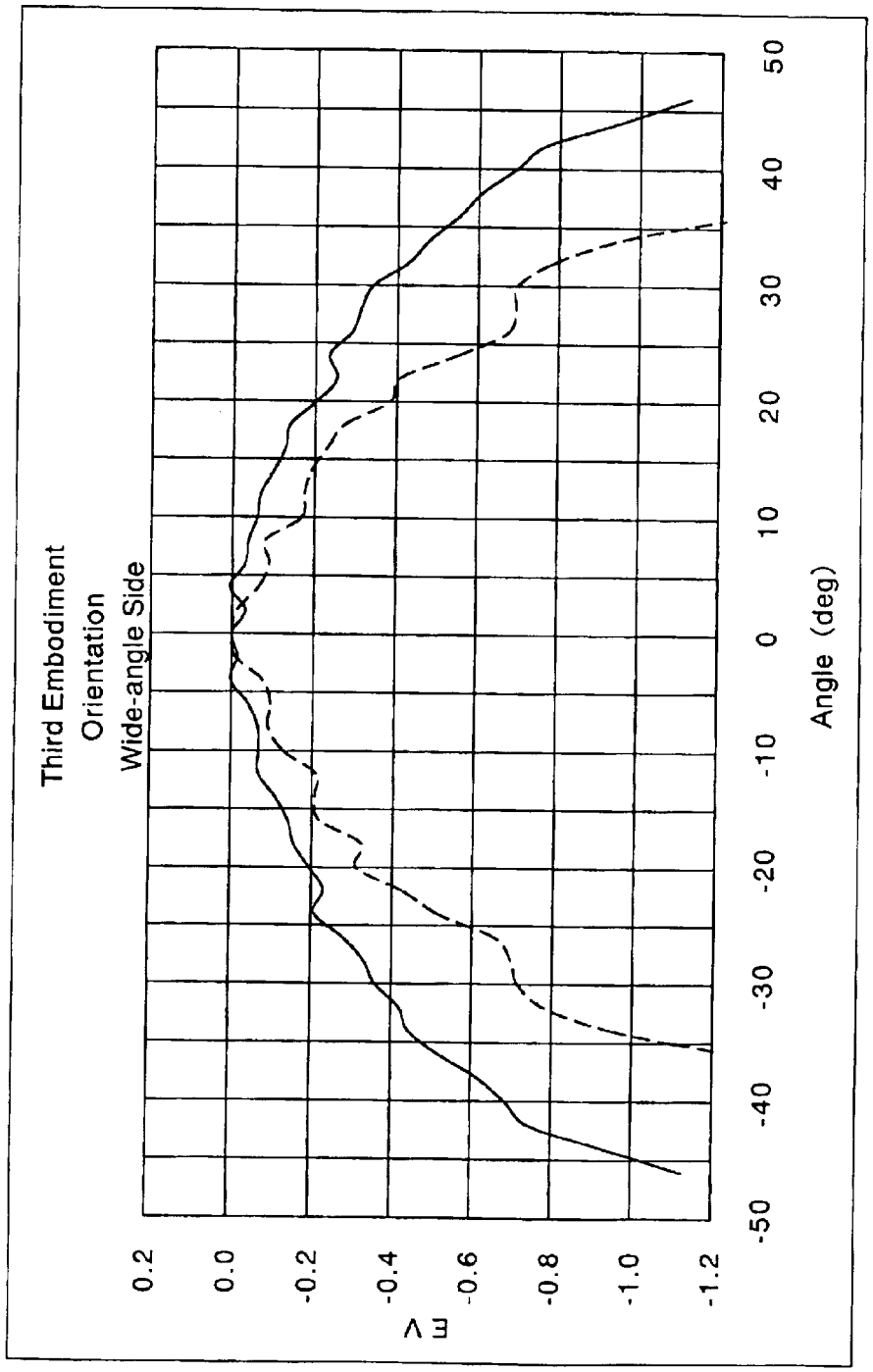
FIG. 14 is a diagram showing light distribution characteristics of a zoom strobe device at a wide angle extremity.
Figure 15:
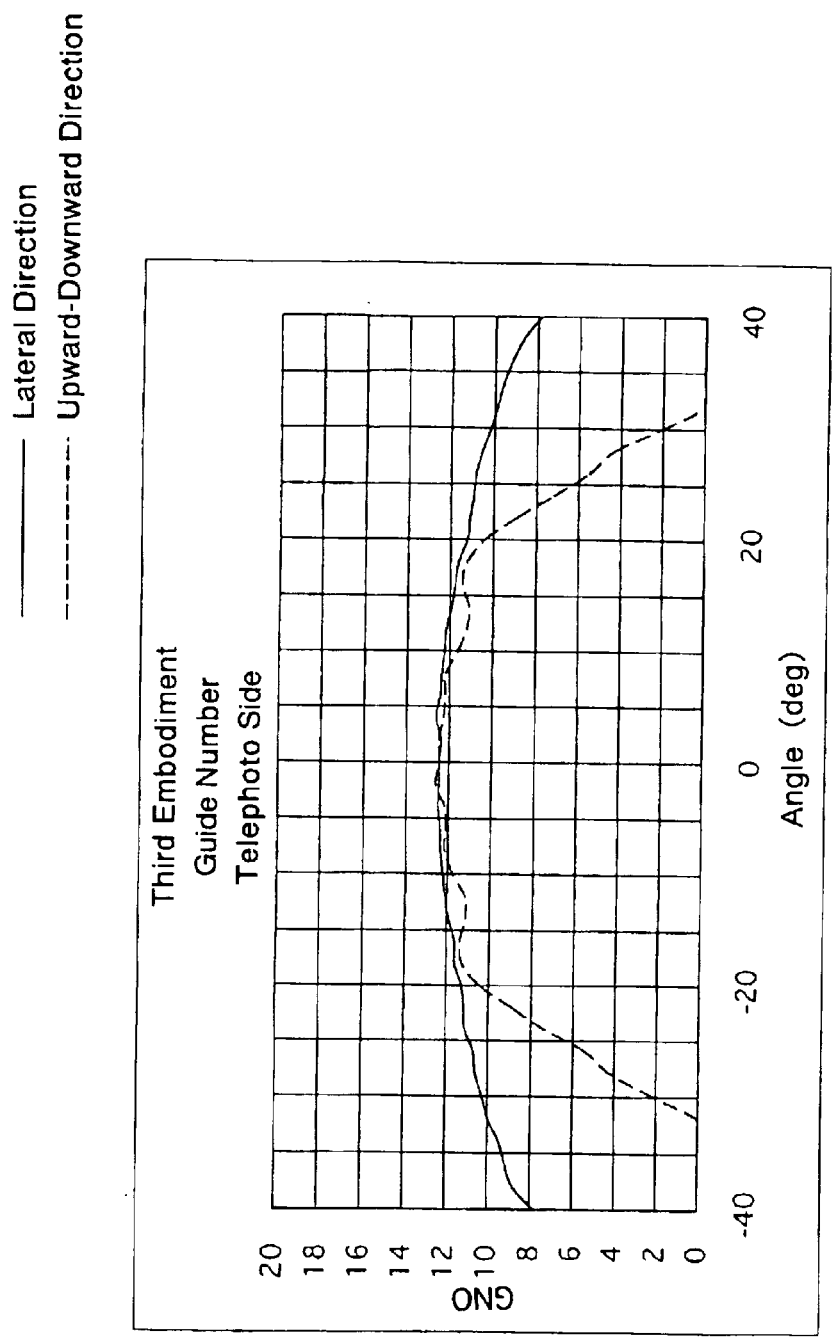
FIG. 15 is a diagram showing guide numbers of a zoom strobe device shown in FIGS. 12A and 12B, at a telephoto extremity.
Figure 16:
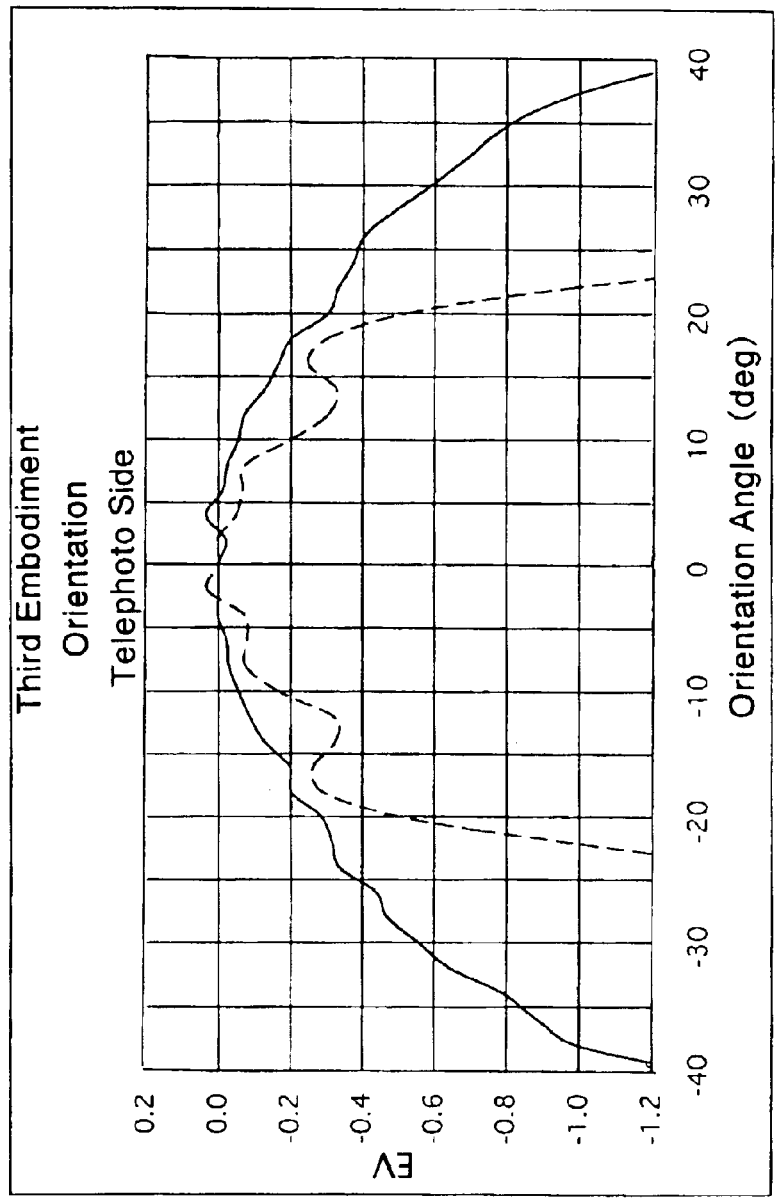
FIG. 16 is a diagram showing light distribution characteristics of a zoom strobe device at a telephoto extremity.

FIGS. 12A and 12B show a structure of Example 3 of numerical data of a zoom strobe device which can accommodate a super wide angle, according to the present invention. FIGS. 13, 14, 15 and 16 show diagrams of the guide number at the wide angle extremity, the light distribution characteristics at the wide angle extremity, the guide number at the telephoto extremity and the light distribution characteristics at the telephoto extremity, of a strobe device shown in FIGS. 12A and 12B, respectively.

Specifications of Example 3 are as follows:

Height H of the Fresnel lens in the upward/downward direction: 8.2

Width W of the Fresnel lens in the lateral direction: 21.0

Specifications of the first surface of the Fresnel lens (adjacent to the reflector):

$R=40$, $K=-10$ (rotationally symmetrical aspherical surface, Fresnel pitch 0.5)

Specifications of the second surface of the Fresnel lens:

$Ry$ (upward/downward direction)=$\infty$, $Rz$ (lateral direction)=$-100$

Length Lw in the forward/rearward direction on the wide angle side: 6.9

Length Lt in the forward/rearward direction on the telephoto side: 11.1

Resultant lens power $\phi$ in the upward/downward direction: 0.0123

Guide number at the wide angle extremity: 11.58

EV variation at the wide angle extremity ($\Delta EV$) (31° n the upward/downward direction): $-0.75$ EV variation at the wide angle extremity ($\Delta EV$) (41° in the lateral direction): $-0.72$ Guide number at the telephoto extremity: 12.47

EV variation at the telephoto extremity ($\Delta EV$) (12° in the upward/downward direction): $-0.31$ EV variation at the telephoto extremity ($\Delta EV$) (16° in the lateral direction): $-0.19$ The numerical values of the conditions in Examples 1, 2 and 3 are shown in Table 1 below.

TABLE 1

|  | Example 1 | Example 2 | Example 3 |
| --- | --- | --- | --- |
| Condition (1) | 0.117 | 0.146 | 0.085 |
| Condition (2) | 0.816 | 0.720 | 0.841 |
| Condition (3) | 1.448 | 1.256 | 1.354 |

As can be seen from Table 1, the values in each Example satisfy conditions (1) through (3). Furthermore, the camera has relatively large guide numbers at both the wide angle extremity and the telephoto extremity and exhibits a substantially uniform light amount distribution from the central portion to the edge portion of the lens.

As can be understood from the above discussion, according to the present invention, it is possible to provide a small zoom strobe device in which sufficient illumination can be obtained from the wide angle side to the telephoto side and from the center area to the marginal area.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom strobe device comprising:

a reflector;

a rod-shaped tubular light emitting tube; and a Fresnel lens;

wherein a distance between the reflector, which is provided on the base thereof with the rod-shaped tubular light emitting tube, and the Fresnel lens is varied to vary a flash angle of illumination, wherein said zoom strobe device satisfies the following conditions (1) and (2):

$$0.08 < \phi \times Lw < 0.15 \tag{1};$$

and $$0.70 < Lw/H < 0.85 \tag{2};$$

wherein $\phi$ designates the resultant power of the Fresnel lens in an upward/downward direction perpendicular to the length of the rod-shaped light emitting tube;

Lw designates the distance between the base of the reflector and an outer surface of the Fresnel lens when the reflector is located closest to the Fresnel lens; and H designates the maximum length of the strobe device in the upward/downward direction.

2. The zoom strobe device according to claim 1, wherein said zoom strobe device satisfies the following condition (3):

$$1.2 < Lt/H < 1.5 \tag{3};$$

wherein

Lt designates the distance between the base of the reflector and an outer surface of the Fresnel lens when the reflector is located farthest from the Fresnel lens.

3. A zoom compact camera having the zoom strobe device according to claim 1.

* * * * *